US007559659B2

(12) United States Patent  (10) Patent No.: US 7,559,659 B2
Rhodes et al.  (45) Date of Patent: Jul. 14, 2009

(54) CONFIGURABLE PROJECTION DEVICE

(75) Inventors: Donald Rhodes, Lake Oswego, OR (US); Morten Johansen, Rolvsoy (NO); Mike Gemelke, Portland, OR (US); Jeff Allison, Lake Oswego, OR (US); Tim Anderson, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/609,870

(22) Filed: Dec. 12, 2006

(65) Prior Publication Data

US 2007/0201005 A1 Aug. 30, 2007

Related U.S. Application Data

(60) Provisional application No. 60/749,921, filed on Dec. 12, 2005, provisional application No. 60/749,815, filed on Dec. 12, 2005, provisional application No. 60/750,220, filed on Dec. 13, 2005.

(51) Int. Cl.
G03B 21/22 (2006.01)
H04N 5/64 (2006.01)

(52) U.S. Cl. .................. 353/119; 353/94; 353/122; 348/789; 361/679.41

(58) Field of Classification Search ............ 353/30, 353/94, 119, 122; 348/739, 744, 789, 794, 348/836; 439/237, 297; 352/34; 361/679.41, 361/679.45
See application file for complete search history.

(56) References Cited

U.S. PATENT DOCUMENTS

| | | | | |
|---|---|---|---|---|
| 2002/0186329 | A1* | 12/2002 | Tong et al. | 348/839 |
| 2004/0246450 | A1* | 12/2004 | Soper et al. | 353/94 |
| 2005/0088620 | A1 | 4/2005 | Dwyer et al. | 353/15 |
| 2006/0248251 | A1* | 11/2006 | Tracy et al. | 710/303 |

* cited by examiner

*Primary Examiner*—Rochelle-Ann J Blackman
(74) *Attorney, Agent, or Firm*—Alleman Hall McCoy Russell & Tuttle LLP

(57) ABSTRACT

A modular projection device. The modular projection device includes a docking interface for selectively coupling the projection device to a content source module that provides the projection device with video content for projection onto a projection surface.

23 Claims, 9 Drawing Sheets

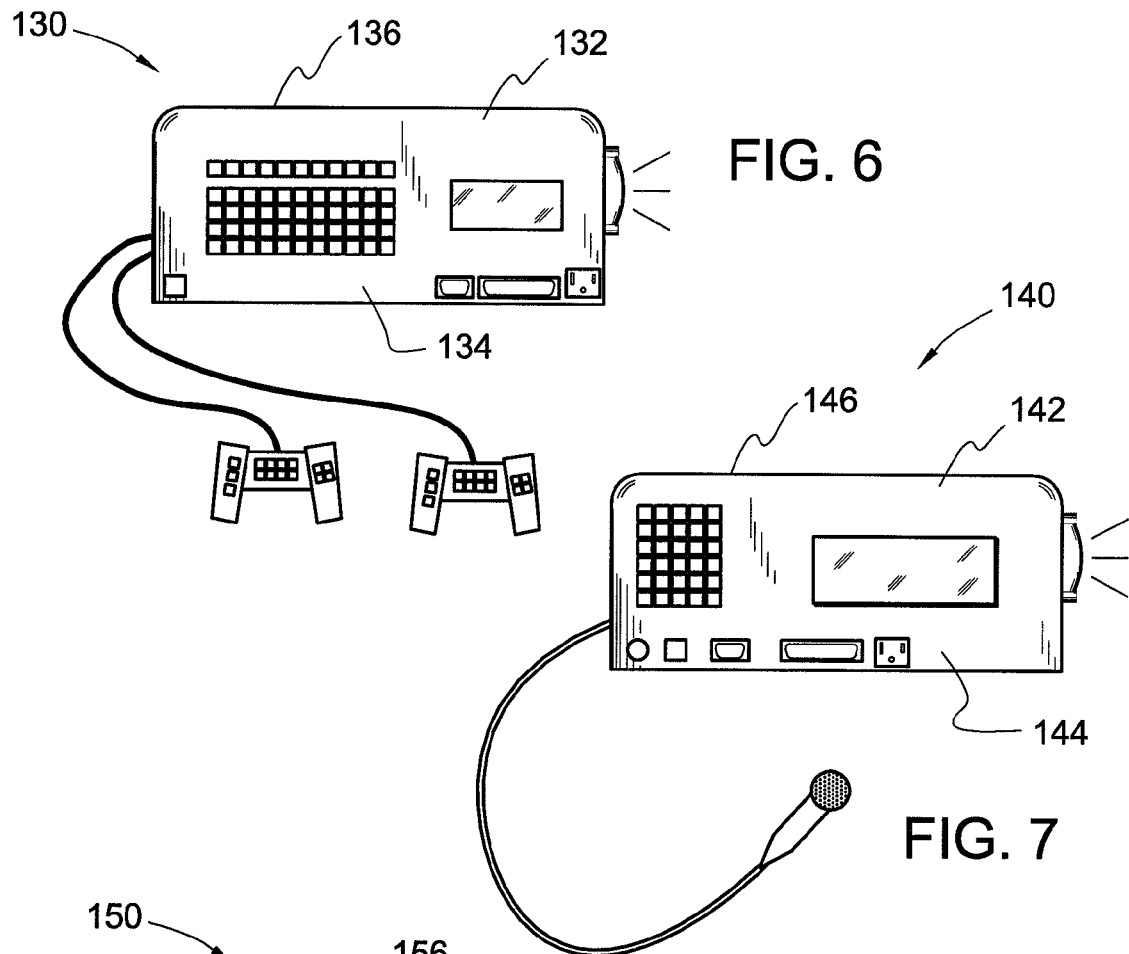
FIG. 6
FIG. 7
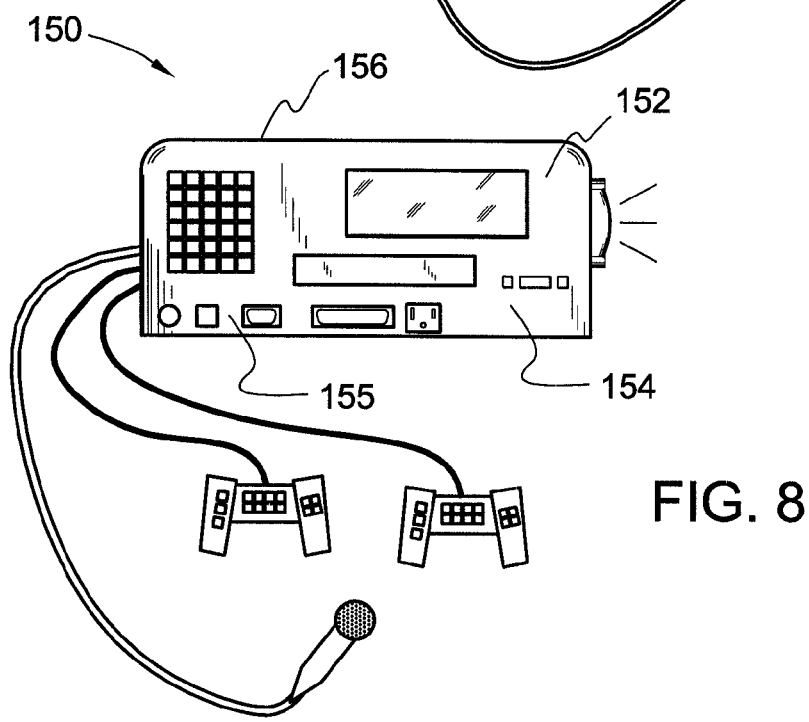
FIG. 8

CONFIGURABLE PROJECTION DEVICE

CROSS REFERENCE TO RELATED APPLICATIONS

This application claims the benefit of U.S. Provisional Applications 60/749,921, filed on Dec. 12, 2005; 60/749,815, filed on Dec. 12, 2005; and 60/750,220 filed on Dec. 13, 2005; the entirety of which are hereby incorporated herein by reference for all purposes.

BACKGROUND

Multimedia projection systems have become popular for purposes such as conducting sales demonstrations, business meetings, and classroom training, and for use in home theaters. There are many models of projection devices, each adapted for a particular purpose based on a number of factors such as performance criteria, portability, and price. Customizing a projection device for one purpose may restrict the flexibility of utilizing the device for other purposes.

BRIEF DESCRIPTION OF THE DRAWINGS

Embodiments of the invention are illustrated by way of example and not by way of limitation in the figures of the accompanying drawings, in which like references indicate similar elements and in which:

FIGS. 6-8 illustrate projection devices including integrated content source modules;

DETAILED DESCRIPTION

The present disclosure is directed to a modular projection system in which a projection device can be selectively coupled with one or more different content source modules. The different content source modules can be chosen to provide the projection device with a desired type of content. The projection device can be customized based on which source modules are coupled to the projection device, and a user can incrementally add new functionality to the projection device by adding new source modules and/or replacing old source modules with new source modules.

The ability to couple, or dock, the source module and the projection device together creates a more integrated product. As nonlimiting examples of possible integration, the projection device and various docked source modules can share a common power source, commands can be relayed from the projection device to the source module, or vice versa; commands received from a remote control can be relayed from the projection device to the source module, or vice versa; the various devices can include vents that align so that cooling channels can be formed, etc. Such integration can reduce cost by eliminating redundant parts; improve usability by offering integrated controls; decrease clutter and improve aesthetics by eliminating cables; and/or provide other benefits.

Figure 1:
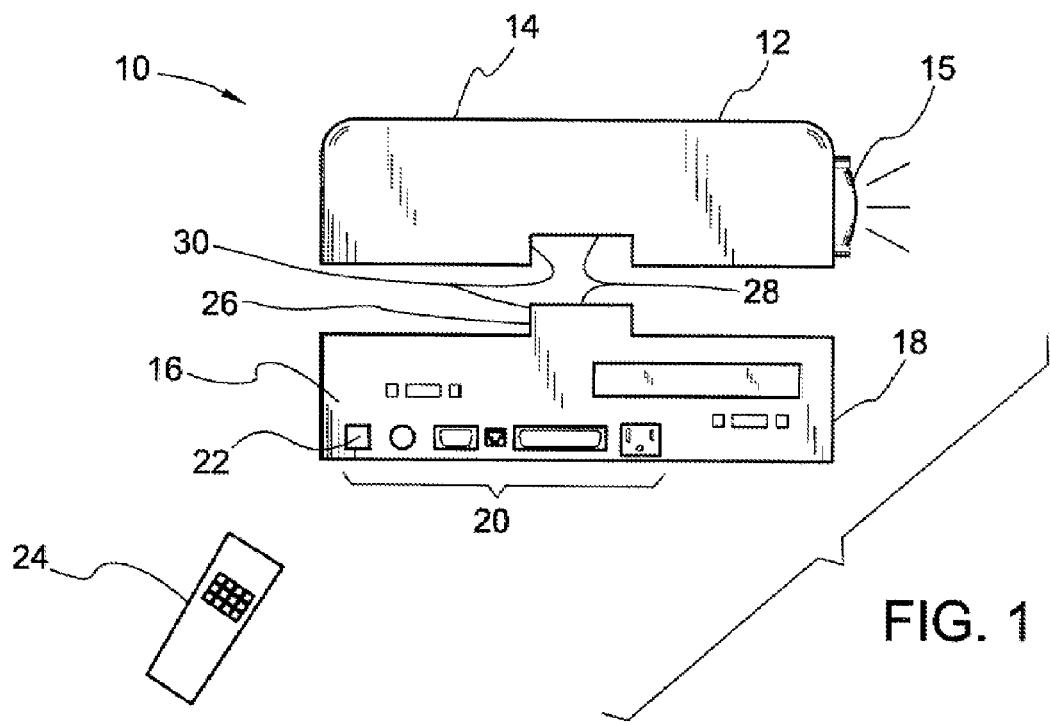
FIG. 1 illustrates a configurable projection device in accordance with an embodiment of the present invention.

FIG. 1 shows a configurable projection system 10 in accordance with an embodiment of the present invention. Projection system 10 includes a projection device 12 and a content source module 16. As shown, projection device 12 includes a projection device body 14 configured to include a projection engine (not shown) which may include electronics, optics, and/or other components for projecting video and/or still images. The optics may include a lens 15 that extends outside of the projection device body 14. In other embodiments, the lens may be recessed or flush with the device body.

Content source module 16 (hereinafter, simply "source module") may be configured to communicatively coupled to the projection device 12. The source module may be housed within a source module body 18 and may be configured to include functionality for one or more activities including, but not limited to, karaoke, audio/video playback, video capture, gaming, audio input, and audio output. The source module may include an audio component which may include one or more speakers, and such audio component may be made integral with or detachable from the source module.

The source module 16 may include various interfaces 20 which may be configured to provide power, input signals, output signals, control, and/or communication signals. While the interfaces are shown located on the side of the source module, it should be understood that interfaces can be located at various places on the source module and/or projection device. In particular, in some embodiments, a projection device may include its own power interface and video interface, thus allowing the projection device to be used as a stand-alone projector independent of any docked content source module. Likewise, in some embodiments, a source module may not include a power interface and/or a video interface other than the docking interface.

A sensor 22, for example an IR sensor, may be included with the interfaces 20 to receive one or more control signals from, for example, a remote control device 24. In some embodiments, the source module and/or the projection device can be configured for use with radio frequency remote control signals.

A remote sensor (or receiver) may be configured to receive a signal as well as to relay a signal to the projection device 12. The projection device 12 may be configured to react to signals it recognizes. Signals it does not recognize, it cannot act upon, and/or is configured not to act upon, may be ignored or sent back to the source module 16. If sent back, the source module 16 may react to the signals that have been sent back. In various embodiments, the source module 16 may make a determination first to act on a signal, and to send signals it does not recognize, cannot act upon, and/or is configured to not act upon, to the projection device 12.

In various embodiments, a projection device may be coupled to a power source and may be configured to provide power to a source module via an electrical interface. In other embodiments a power source may be connected to a source module and the source module may provide power to the projection device via an electrical interface. When only one of the projection device and the source module includes an independently operable power source, a common control can be used to turn both the projection device and the source module on and off, although this is not required in all embodiments.

The source module body 18 may be configured to include a docking interface 26, and the projection device 12 may be configured to include a complementary docking interface. The docking interfaces may include electrical contacts and registration features, and may be configured to electrically and physically couple to the projection device via an electrical interface 28 and a physical interface 30, herein schematically represented as similarly shaped rectilinear forms. Various embodiments may include variously configured interfaces, and the schematic depictions provided herein are in no way intended to be limiting.

The electrical interface 28 may include one or more connections that may be configured to utilize various protocols to effect communication. For example, the electrical interface 28 may use a common interface standard such as a RS232 (EIA232). Other interface standards may additionally or alternatively be used. Electric coupling of the projection device 12 and the source module 16 may include coupling for communication and coupling for power transmission. In various embodiments the coupling may include a wireless coupling (e.g., the source module is physically coupled to the projection device, but information is wirelessly shared). The physical interface 30 may be configured to include one or more registration features such that the projection device 12 may be properly and easily coupled to the source module body 18, and the electrical interface 28 may be properly connected. The projection device and source module may be configured to be coupled to one another in a detachable manner. In various embodiments, detachment may be effected in various ways, for example, by simply pulling the projection device away from the source module, or by pulling the source module away from the projection device. In some embodiments, a latch arrangement (not shown) may maintain a coupled arrangement, and a release mechanism may be included to uncouple the devices.

In addition to the electrical interface, the physical interface 30 may enable physical/mechanical attachment of the projection device to the source module. For example, in FIG. 1, projector 12 and source module 16 include docking interfaces that are physically shaped to enable alignment and proper attachment of the projection device to the source module. It should be appreciated that in some embodiments, mating and locking features may be provided on the projection device and the source module. For example, a first physical feature may be provided on the underside of the projection device which is configured to mate with a corresponding physical feature on the top of the source module, or vice versa. In some embodiments, the mechanical attachment features may serve as alignment features. For example, attachment of the projection device to the source module using the alignment features may ensure coupling where the electrical interface may be properly connected.

As an example, in some embodiments, the projection device and source module may be configured such that they may be snap-fit together. Snap fit components may provide an easy to couple arrangement which, in some embodiments, may provide positive confirmation upon connection. For example, in some embodiments, a first surface, such as the bottom of the projection device, may include a recess or detent configured to receive a mating protuberance or extension from a second surface, such as the dock surface. The fit of the extension within the recess may be such that the projection device and dock are engaged. The positive confirmation may include a sound element confirming that the projection device and dock are properly connected. In other embodiments, the connectors may provide a releasable locking engagement, such that the projection device and dock function and appear as a single unit. Although shown in FIG. 1 with mating features on the bottom of the projection device and top of the source module, such features may be provided on any suitable complimentary surfaces to enable proper connection of the source module and the projection device.

Figure 2:
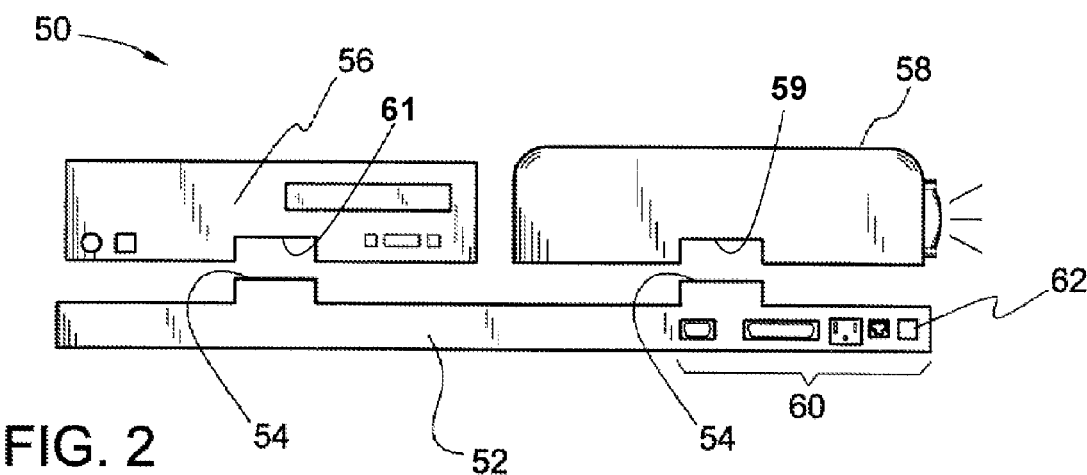
FIG. 2 illustrates a configurable projection device in accordance with an embodiment of the present invention.

FIG. 2 shows a configurable projection device 50 in accordance with another embodiment of the invention. In this embodiment a docking station 52 may be configured to include two docking interfaces 54 upon which may be coupled a source module 56 and a projection device 58, which may be substantially interchangeable with the projection device 12 described above. The docking station 52 may be configured to communicatively couple the source module 56 to the projection device 58. The docking station 52 may be configured to include various interfaces 60 which may be configured to provide power, and/or input, and/or output signals to the source module 56, and the projection device 58. Interfaces 60 may include a sensor 62 which may be configured to receive signals from, for example, a remote control (not shown). Various embodiments may provide a configurable projection device which may include a docking station communicatively interposed between a projection device and a source module.

As illustrated projection device 58 includes a first docking interface 59, content source module 56 includes a second docking interface 61, and docking station 52 includes third and a fourth docking interfaces 54 configured to mate with the first and second docking interfaces 59 and 61 respectively.

In one embodiment, the docking interface may be coupled to the projection engine, and adapted to facilitate removable receipt of the projection device by a content source module directly, or a docking station adapted to removably receive both the projection device and the content source module directly. Such arrangements enable the projection device to receive processed or unprocessed content from the content source module, or to enlist the content source module to assist in processing content to be received by the projection device. Unprocessed content may be taken to mean content in video data form, and processed content may be taken to mean content processed into video signals.

One embodiment according to the invention may include an apparatus comprising a content source module, and a docking interface coupled to the content source module, which may be configured to either removably receive a projection device to project content output by the source module, and/or to removably receive another apparatus which may have a complementary docking constitution to enable content output by the content source module provided to the projection device for projection, through at least the removably received another apparatus.

Figure 3:
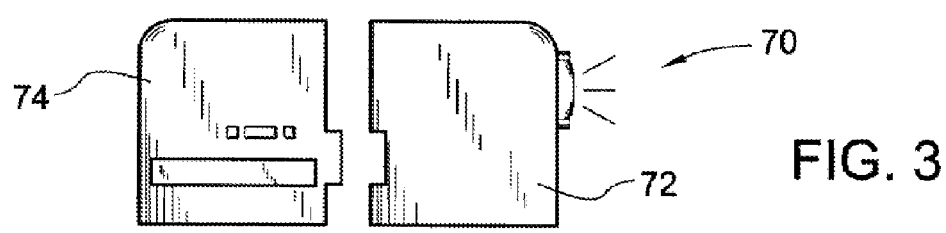
FIG. 3 illustrates a configurable projection device in accordance with an embodiment of the present invention.

FIG. 3 shows a configurable projection device 70 in accordance with one embodiment of the invention, wherein a projection device 72 may be communicatively coupled to a source module 74 in a side-by-side relationship. Other embodiments may include various interpositional relationships between a projection device and one or more source modules.

Figure 4:
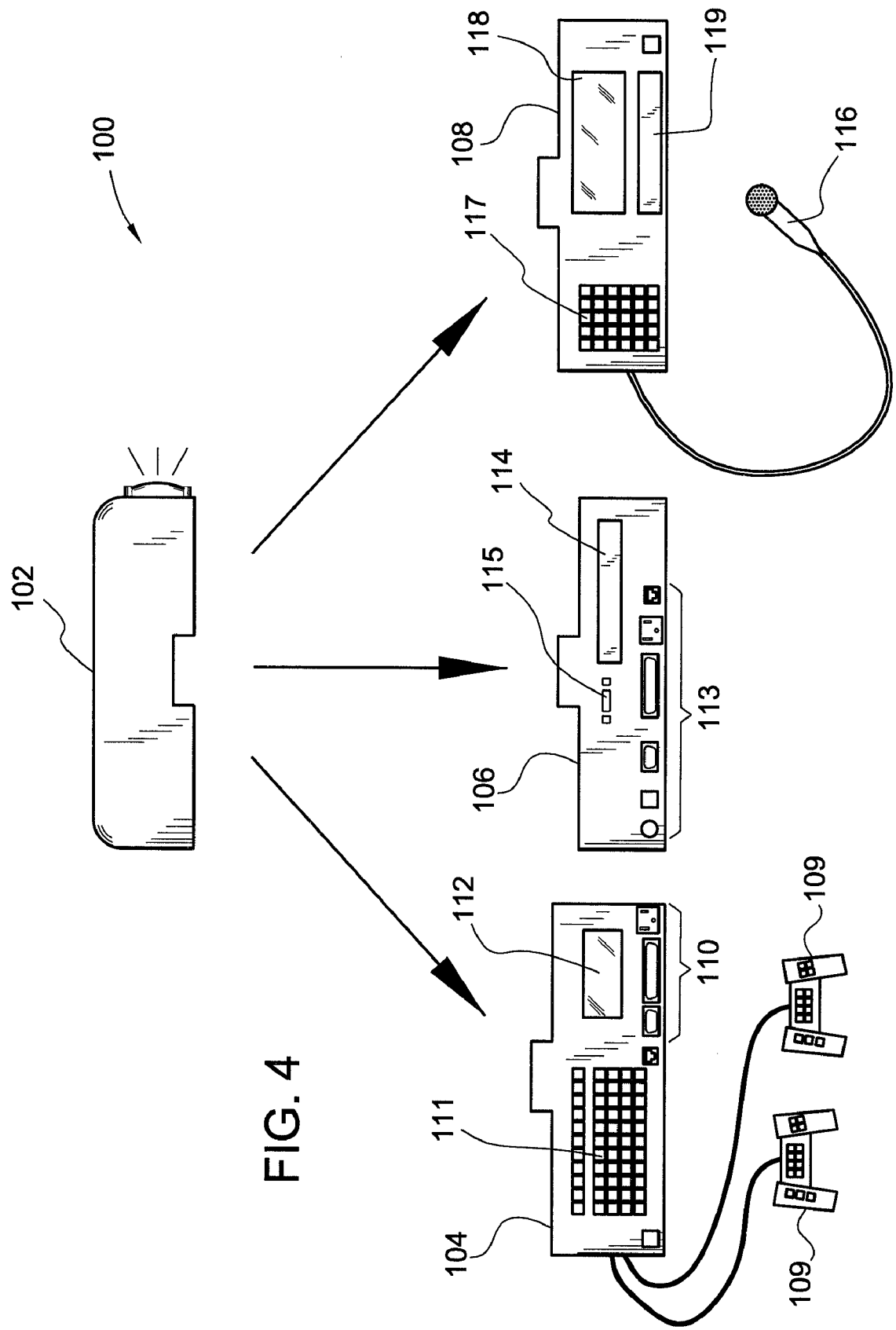
FIG. 4 illustrates a system in accordance with an embodiment of the present invention.

FIG. 4 shows a system 100 wherein a projection device 102 may be configured to be physically coupled to various source modules including, but not limited to, a video gaming module 104; a general purpose audio/video source module 106 including, but not limited to, a DVD player, a video player, television tuner, digital video recorder, high definition (HD) gaming sets, set-top box, satellite/cable box, camera, computer, web browsers, learning modules, video conferencing, voice over IP (VOIP) or the like; or a karaoke module 108.

The video gaming module 104 may include one or more controllers 109 which may include features to, for example, control a game which may be projected on, for example, a screen by the projection device 102. In various embodiments the video gaming module 104 may be coupled via wires, or a wireless connection to any other type of display or multiple displays such that one player may have one view, and another player may have another view, and in various embodiments the same or different, or multiple views could be seen by, for example, an audience. In various embodiments a docking station may include a plurality of interfaces such that more than one projection device may be interconnected with a gaming module and/or other source module. The video gaming module 104 may include various interfaces 110 for input, output, power, control and/or communication signals. A key pad 111 and a display screen 112 may be included to facilitate interaction before, during, or after a gaming event.

The video source module 106 may include various interfaces 113 which may function the same as or similar to interfaces 20 as described regarding FIG. 1. A media interface 114 may be configured to receive a removable mass storage device, for example media including, but not limited to, a DVD disk, a videotape, a solid state memory, or a CD-ROM. The media interface 114 may be for example, a disk drive. In some embodiments, one or more of the source modules and/or the projection device may include a media card reader with corresponding viewers, including, but not limited to Micro-Drive MD, Compact Flash CF, SmartMedia SM, Memory-Stick MS, Secure Digital SD, MultiMedia Card MMC, etc. Further some embodiments may include a DVI connector, a VGA connector, such as VESA 15 pin VGA connector, etc.

Furthermore, buttons 115 may affect functions including, but not limited to, opening or closing the media interface 114, stopping, advancing, reversing the media, and the like. Images of, for example, a movie from the video source module 106 may be projected by the projection device 102.

The karaoke module 108 may include audio inputs such as a microphone 116. One microphone is illustrated here. Various embodiments may be configured to be used with two or more audio inputs. A key pad 117 and a display screen 118 may be included to facilitate interaction during, for example, song selection. A media interface 119 may be configured to accept removable media such as a CD+G (Compact Disc plus Graphics). Images related to a song being played by the karaoke module 108 including but not limited to the words to a song, may be projected by the projection device 102. The display screen 118 may also display, for example, words to a song being played. Audio output (not shown) may be included in the karaoke module 108.

In various embodiments one or more source modules, for example the karaoke module 108, may include a camera which may be coupled to the karaoke module 108 via a cable, for example, or via a wireless connection. A camera may also be made integral, in one embodiment, with the source module. The camera may be configured to, for example, capture the image of a person singing a song being played by the karaoke module 108, and to project the image with the projection device 102. The projected image may be combined with other images, for example a karaoke film, and the combination may be in the form of picture in picture, or in split-screen form. In various embodiments, so called blue screen, or green screen, or similar techniques may be used to produce a composite image.

Figure 5:
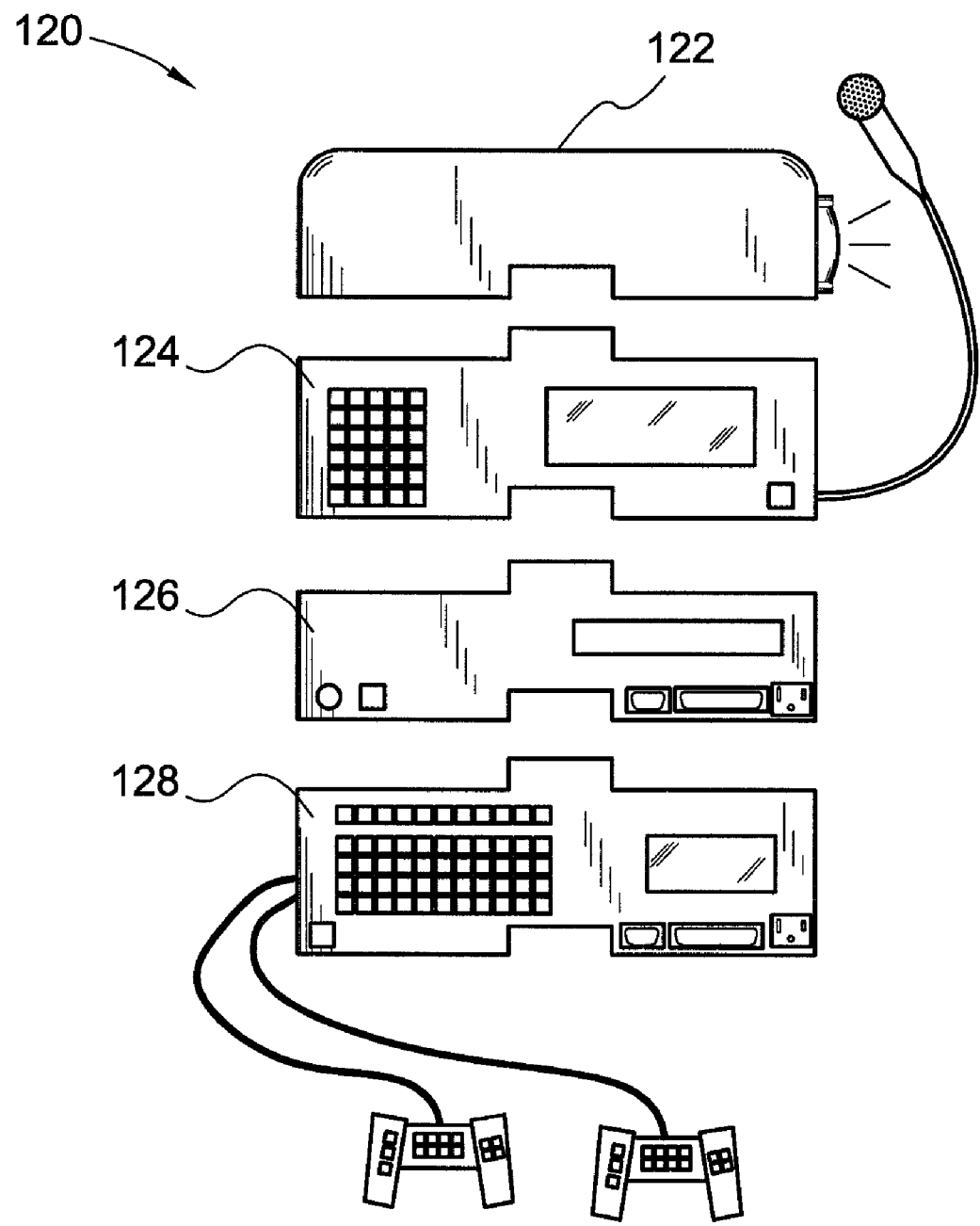
FIG. 5 illustrates a system in accordance with an embodiment of the present invention.

FIG. 5 shows a configurable projection system 120 in accordance with an embodiment of the invention. In this embodiment, a projection device 122 may be configured to couple to a first source module 124 which may in turn be configured to couple to a second source module 126 which may be configured to couple to a third source module 128, and so on.

For example, the projection device 122 may have a first docking interface that is configured to couple to various source modules, in this case the docking interface on the top surface of source module 124. The first source module 124 may include a second docking interface, on the bottom surface of the source module adapted to mate with the docking interface of source module 126. Further source module 126 may mate with source module 128 in a similar fashion. In the illustrated embodiment, the docking interfaces facilitate removable acceptance of the projection device and the various source models so that each of the respective components may be stacked so as to provide a modular entertainment system that has a small physical footprint. Additionally, the interconnected nature of the various modules may create smooth lines and styling, thus having improved aesthetics compared to discrete components.

It should be appreciated that the source modules may be coupled in any quantity and in any order since the source modules all share compatible docking interfaces. Further, in some embodiments, the projection device may include multiple docking interfaces on different surfaces such that the projection device may be located at other locations in the stack.

FIG. 6 shows an apparatus 130 wherein a projection device 132 is integrally coupled with a source module 134 in accordance with an embodiment of the present invention. The projection device 132 and source module 134 may be integrally coupled to one another by being codisposed within a casing 136. In this embodiment, the source module 134 may include functionality for video games similar to the video gaming module 104 discussed above.

FIG. 7 shows an apparatus 140 wherein a projection device 142 is integrally coupled to a source module 144 in accordance with an embodiment of the present invention. The projection device 142 and the source module 144 may be integrally coupled to one another by being disposed within a casing 146. In this embodiment, the source module 144 may be configured for audio input and/or output and may include functionality for karaoke similar to the karaoke module 108 discussed above. In some embodiments, speakers (not shown) may be configured to be integral with the apparatus 140.

FIG. 8 shows an apparatus 150 wherein a projection device 152 is integrally coupled to a first source module 154 and a second source module 155 in accordance with an embodiment of the present invention. In this embodiment, the first source module 154 may provide functionality for one or more video games and the second source module 155 may include audio input, audio output, and/or functionality for karaoke. The projection device 152, the first source module 154, and the second source module 155 may be integrally coupled to one another by being disposed within a casing 156.

Figure 9B:
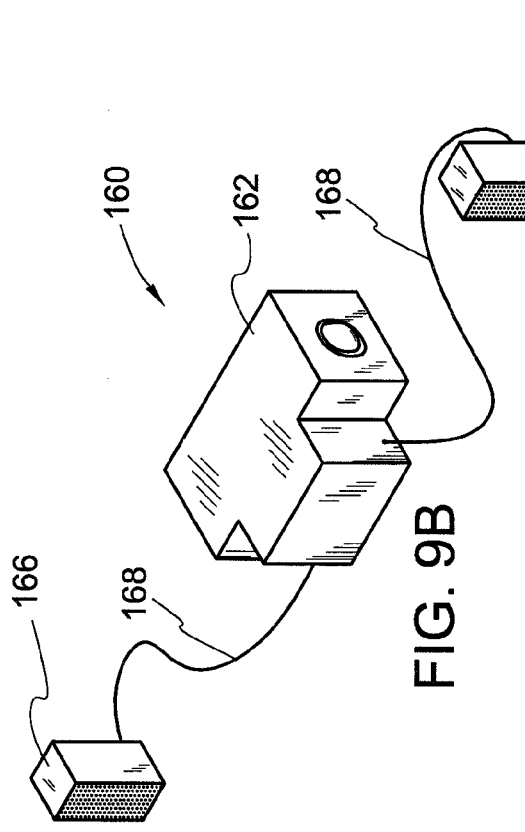
FIG. 9A and FIG. 9B illustrate a configurable projection device in accordance with an embodiment of the present invention.
Figure 9A:
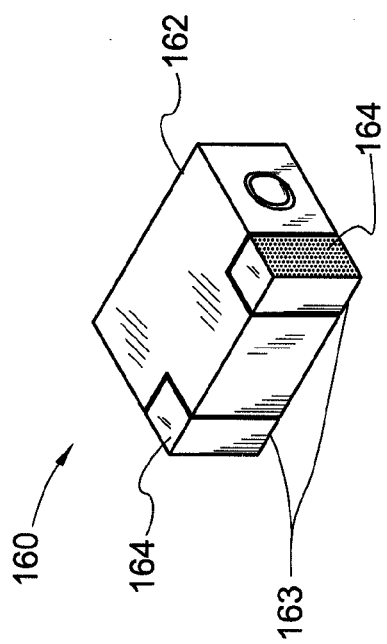

FIG. 9A and FIG. 9B show a configurable projection device 160 in accordance with an embodiment of the invention. In this embodiment, a projection device 162 may include an audio component including one or more speakers. The speakers 164 may be coupled to the projection device 162 in a detachable manner. In FIG. 9A, the speakers 164, which may be configured to provide audio output, are shown in an attached configuration 163 where the speakers 164 are coupled to the projection device 162. FIG. 9B shows another configuration of the projection device 162 wherein the speakers 166 are detached from the projection device 162. In one embodiment the speakers 166 may be placed in a spaced apart configuration which may provide stereo, and/or surround sound functionality. The speakers 166 may be communicatively coupled to the projection device 162 with wires 168. In various embodiments speakers may be communicatively coupled to the projection device via a wireless connection. In various embodiments headphones (e.g. wired or wireless) may be included.

Figure 10:
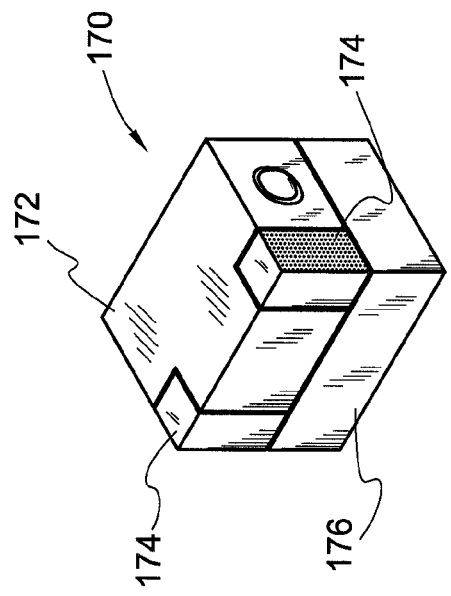
FIG. 10 illustrates a configurable projection device in accordance with an embodiment of the present invention.

FIG. 10 is an isometric view illustrating a configurable projection device 170 which may include a projection device 172 configured to be physically and electrically coupled to speakers 174 which may be decoupled from the projection device 172 to provide stereo, and/or surround sound functionality similar to the embodiment illustrated in FIG. 9B. A source module 176 may be configured to be physically and/or electrically coupled to the projection device 172, and/or the speakers 174, to provide additional functionality which may include, for example, karaoke, one or more video games, or a video device such as a DVD unit.

Figure 11:
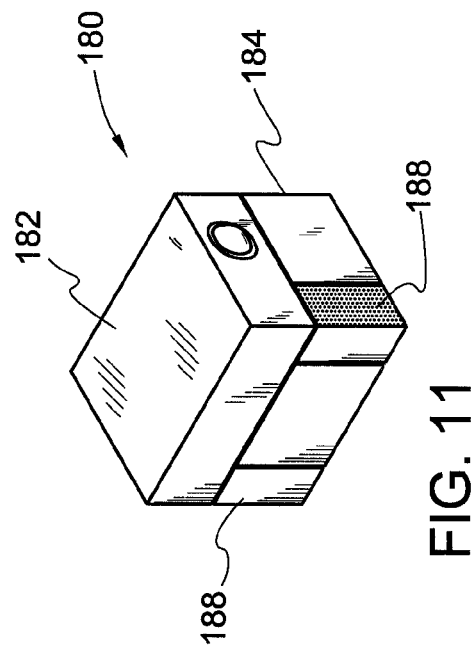
FIG. 11 illustrates a configurable projection device in accordance with an embodiment of the present invention.

FIG. 11 is an isometric view illustrating a configurable projection device 180 in accordance with an embodiment of the invention. In this embodiment a projection device 182 may be physically and electrically coupled to a source module 184 to provide functionality including, but not limited to, karaoke, one or more video games, or video functionality. The source module 184 may be physically and/or electrically coupled to speakers 188 which may be decoupled from the second source module and placed in a spaced apart configuration such as that illustrated in the embodiment shown in FIG. 9B. In some embodiments, source modules may include speakers, including low frequency speakers or subwoofers. In some embodiments, such speakers may be magnetically shielded. It should be appreciated that subwoofers and/or other speakers may dock to a content source module and/or directly to a projection device, thus, further customizing the projection device.

Figure 12:
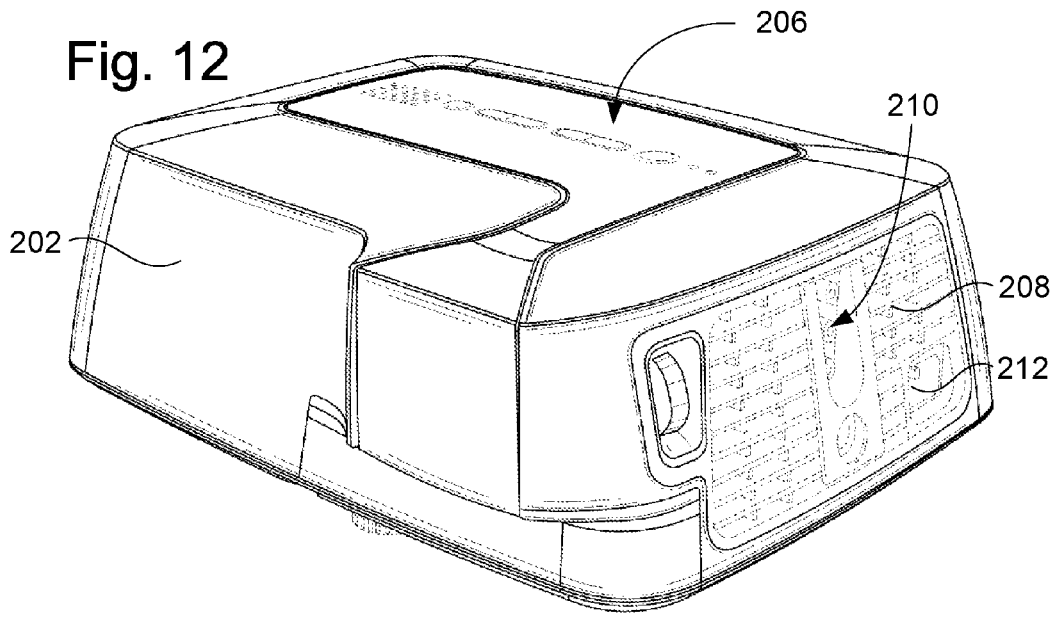
FIGS. 12-14 illustrate an exemplary embodiment of a configurable projection system including a projection device and a DVD module.
Figure 13:
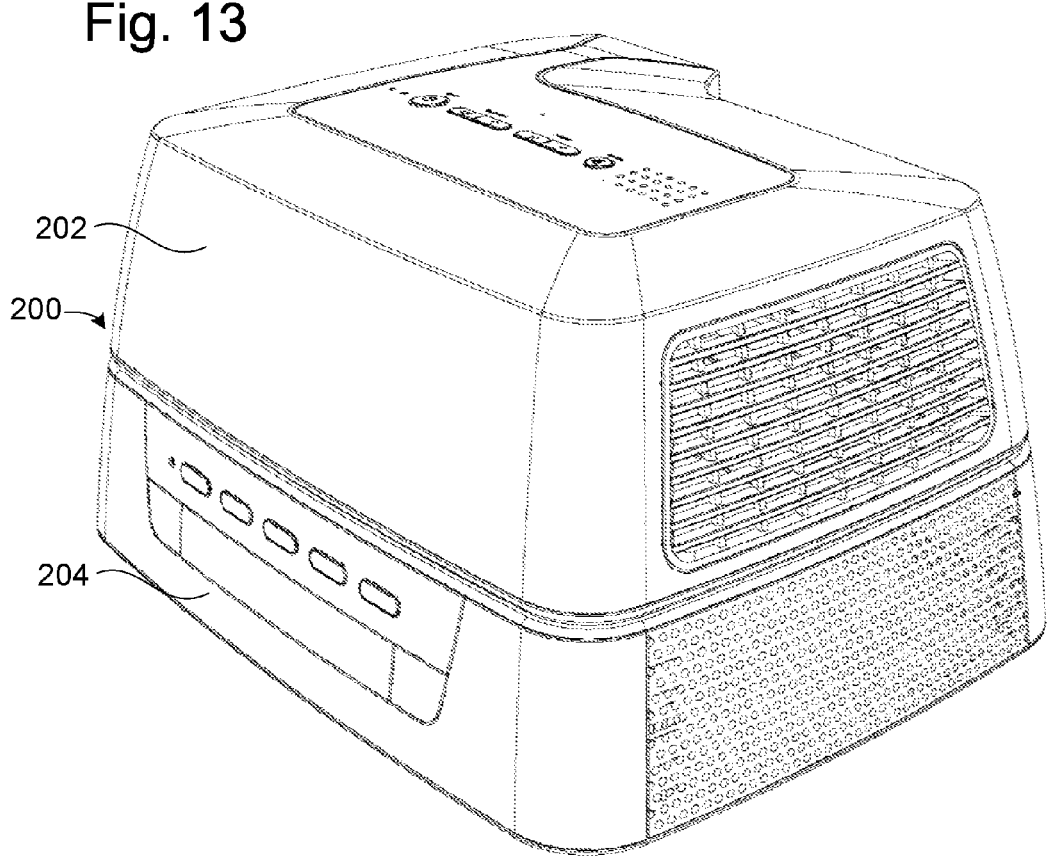
Figure 14:
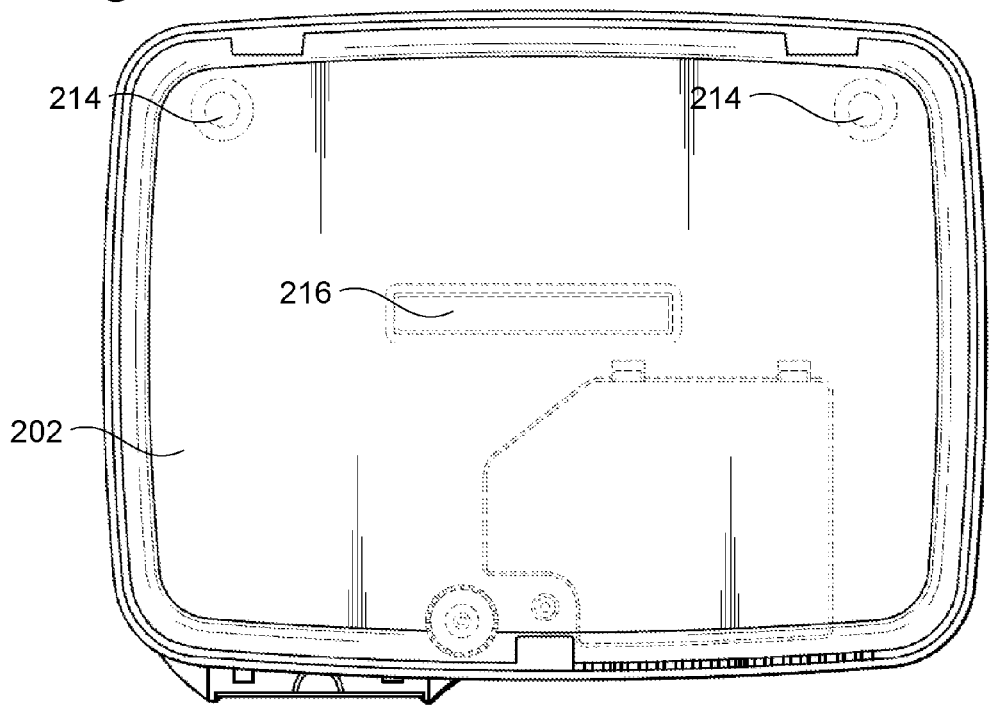

FIGS. 12-14 show another embodiment of a configurable projection device 202. As shown in FIG. 12, the projection device 202 may include a display configuration control panel 206, vents 208, peripheral connection ports 210, and a power cord port 212 among other interface elements used to present video and/or audio content. Furthermore, the projection device 202 may function similar to the projection device shown in FIG. 1 and described above.

FIG. 13 provides an illustration of an exemplary audio/video system 200 with the projection device 202 and a source module 204 in a stacked configuration. Each respective module may include docking assemblies configured to couple to corresponding docking assemblies on other modules. The projection device 202 and the source module 204 may be configured such that the modules may be selectively coupled electrically and physically to each other via the docking assemblies.

As shown in FIG. 13, the projection device includes a bottom surface that substantially matches a top surface of the source module. In other words, the side of a component that includes a docking interface can be referred to as the docking side (e.g., the bottom side of projection device 202 and the top side of source module 204). The edge of a docking side that defines the docking side can be referred to as an edge-profile. In some embodiments, the edge-profile of the projection device matches the edge-profile of the source module (e.g., the bottom-side size and shape of projection device 202 matches the top-side size and shape of source module 204). Therefore, when docked together, the projection device and the source module appear to be a single integrated unit.

FIG. 14 provides a bottom view of the projection device of FIG. 12. As shown, the bottom of the projection device 202 includes a docking assembly 216. The docking assembly is positioned in a central portion of the bottom of the projection device 202, although this is not required in all embodiments. As described above, the docking assembly 216 may be used to couple a first module to a second module. The docking assembly 216 may be configured to electrically and operatively couple the projection device with a corresponding docking receiver (not shown) on the top of the source module 204.

In one example, the docking assembly 216 may include an electrical interface that may enable the projection device 202 to be directly engaged with the source module 204. The electrical interface may include one or more connections that may be configured to utilize various protocols to effect communication. As discussed above, electric coupling of the projection device 202 and the source module 204 may include coupling for communication and coupling for power transmission. In some embodiments the coupling may be a wireless coupling. Further, the power connection may provide power from the projection device to the DVD module or vice versa. By having a single powered unit, the system may be simpler to use.

Though not shown, it should be understood that the projection device may include a vent on its bottom that is aligned with a vent on the top of a source module. In this way, hot air from the source module can be allowed to escape the top of the source module. The projection device may include one or more fans or other cooling devices to process hot air generated by the projection device and/or received from a source module.

Figure 15:
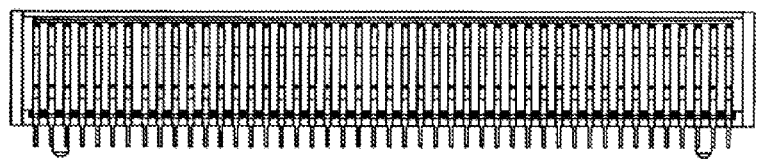
FIGS. 15-17 illustrate an exemplary docking assembly for use with the configurable projection system of FIGS. 12-14.
Figure 16:
Figure 17:

FIGS. 15-17 illustrate example electrical interfaces that may be used in a docking assembly for use with the projection device 202 and source module 204. As shown in FIGS. 15-16, a male electrical interface may include a plurality of pins which may be received within an electrical docking receiver (shown in FIG. 17) to enable electrical communication between the projection device and the source module. The exemplary male electrical interface may be an open frame coupling mechanism. In one example, the male electrical interface may be located on the bottom of the projection device 202 and the electrical interface receiver may be located on the top of the source module 204. In some embodiments, the male electrical interface may be configured to mate to a printed circuit board card edge connector; however, other attachment configurations are possible and within the scope of the disclosure.

In some embodiments, the electrical interface may be inserted with low insertion force. For example, in the illustrated embodiment, the electrical interface may be configured to blindly mate with a card edge connector through zero insertion or substantially zero insertion force method. The shape of the connector may enable long insertion and removal life as there may be reduced metal abrasion over time compared to other contact shapes. Further, the electrical interface may prevent incorrect or reverse insertion.

In some embodiments, in addition to the electrical interface, the docking assembly may include one or more physical coupling mechanisms to enable physical/mechanical attachment. As shown in FIG. 14, physical connectors, also referred to as mechanical guides, 214 may be provided to ensure mechanical coupling and alignment of the projection device 202 to the source module 204. Additionally, features such as lamp access panels may also be accessible via the bottom of the projection device.

Note that while the source module 204 is shown as a DVD module, it should be understood that the projection device 202 can be used with a variety of differently configured content source modules, each of which can provide a different functionality, thus facilitating customization of a projection system. Nonlimiting examples of some of the possible content source modules are provided above. Further, note that the complimentary docking assemblies may be located on different surfaces of the various modules so that the modules may be coupled together. In one example, the docking assemblies may be located on a side surface of the corresponding modules so that the modules may be coupled together in a horizontal configuration.

In some embodiments, a projection device may be configured to project onto a non-vertical surface from a substantially horizontal orientation. Further, in some embodiments, the configurable projection device may receive an accessory that can be selectively installed and uninstalled, wherein the accessory redirects a substantially horizontal projection to a non-horizontal projection. In some embodiments, the projection device accessory includes a reflector that reflects the projected video, and in some embodiments, the projected video can be reflected onto a ceiling.

Figure 18:
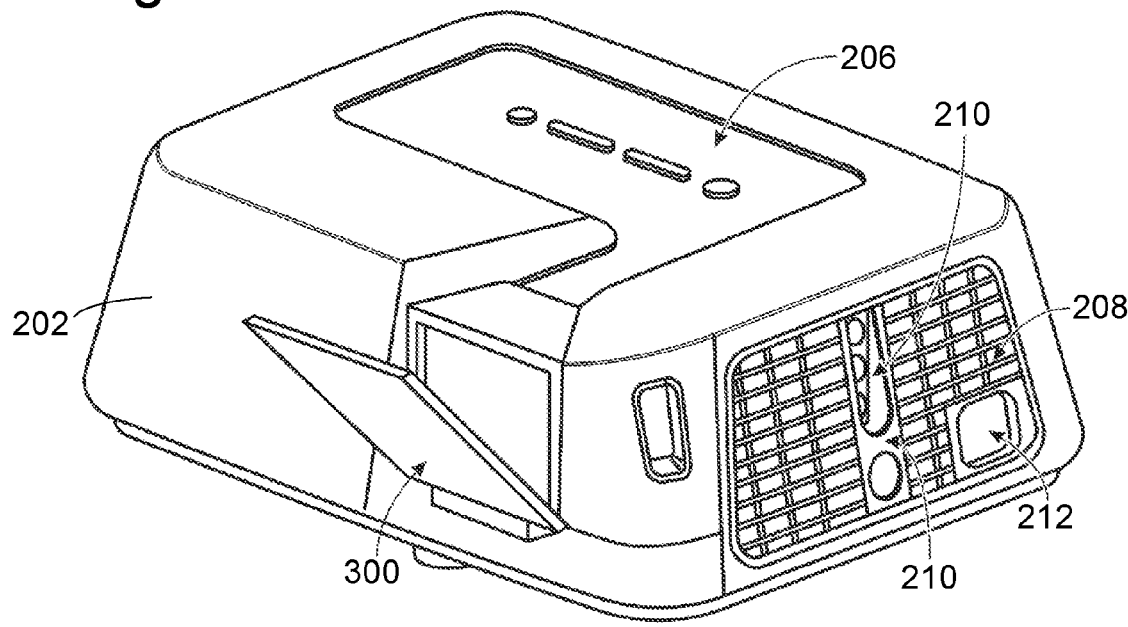
FIG. 18 illustrates the projection device of FIG. 12 mounted with an exemplary redirector configured to redirect projection.

FIG. 18 shows the configurable projection device 202 mounted with a reflector 300 to redirect video projected by the projection device in a first direction to a direction different than the first.

In the illustrated embodiment, the projection device 202 may include a display configuration control panel 206, vents 208, peripheral connection ports 210, and a power cord port 212 among other interface elements used to present video and/or audio content. Furthermore, the projection device 202 may function similar to the projection device shown in FIG. 1 and described above.

It should be noted that a reflector may be mounted to virtually any projection device, and the illustrated reflector is a non-limiting example specifically configured to complement the illustrated projector. Differently configured reflectors can be used with differently configured projectors while remaining within the scope of this disclosure. In the illustrated embodiment, the support frame of the reflector is snap fit to the projector and frames the projection lens without obstructing the projected image. This particular arrangement is not required in all embodiments, and is provided as a representative embodiment of a reflector that is configured to redirect a projected image.

FIG. 18 shows reflector 300 mounted at approximately a forty-five degree angle. An image projected from projection device 202 can reflect off of the angled surface of reflector 300 and can be redirected onto a display surface (e.g. a ceiling) above the projection device when the projection device is in a standard horizontal orientation. Reflectors can reflect a projected image with minimal (or no) distortion and/or light loss.

Some embodiments of the present disclosure may have a reflective surface mounted at a predetermined angle different than forty-five degrees. Some embodiments may have a reflective surface that can be adjustable so as to direct an image at various angles.

One embodiment of a redirector (or reflector) cooperating with a projector may have at least two configurations. In a first configuration, the redirector may be detached from the projector and not intercepting video content. In a second configuration the redirector may be secured to the projector wherein the redirector can intercept and redirect video content in a direction different from the first configuration.

Another embodiment of a redirector may be more permanently attached to the projector housing and may have at least two configurations, wherein the redirector includes a hinge or similar repositioning mechanism, allowing the redirector to change configurations. In a first configuration the redirector may be flipped down so as not to impede the projection of video content. In a second configuration the redirector may be flipped up to intercept and redirect projected video content in a direction different from the first configuration. The redirector may further function as a protective cover when in a closed configuration, different than the first and second configurations.

Figure 19:
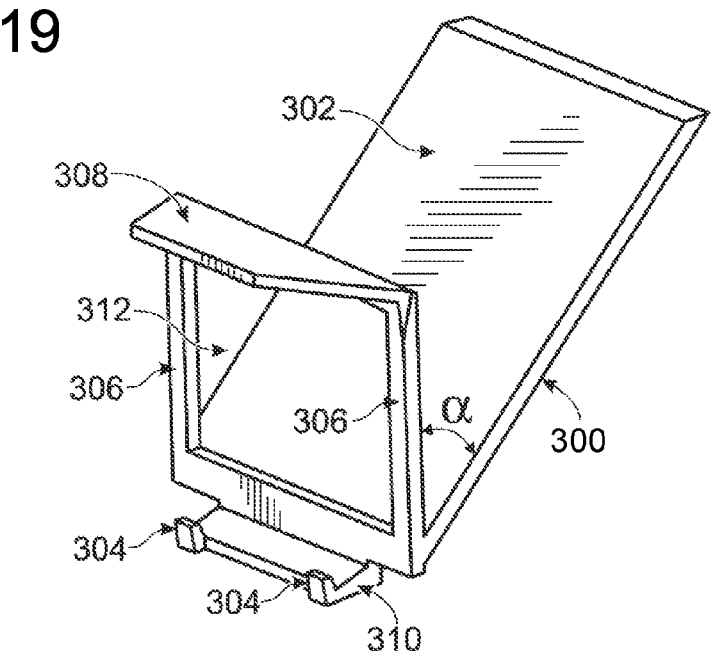
FIG. 19 illustrates the redirector of FIG. 18 apart from the projection device.

FIG. 19 shows reflector 300 independent of a projection device. In the illustrated embodiment, reflector 300 includes a reflective surface 302, underside mounting tabs 304, and a support frame 306 that extends from reflector base 310 and connects to overhang mounting tab 308. Reflective surface 302 can be mounted at an angle a to support frame 306. Other embodiments may have different mounting mechanisms and/or frame arrangements without departing from the scope of this disclosure.

In this embodiment, support frame 306 includes vertical beams that span from reflector base 310 to overhang tab 308. Support frame 306 connects overhang tab 308 to reflector base 310 and to underside mounting tabs 304 while framing an aperture 312 configured to allow a projected image to pass through unobstructed.

As shown, reflective surface 302 can be a rectangular mirror, although this is not required. The reflector can be configured to provide a fixed angle of reflection. The reflective surface can be selected so as to reflect an image with minimal distortion and to maintain image brightness by reflecting the substantial majority, if not the entirety, of the projected light. The reflector can be designed to allow access to the projection lens for cleaning and/or maintenance without removing the reflector from the projector.

A reflective surface can be made of various materials including, but not limited to, glass, dichroic glass, metal, and/or other polished or treated surfaces. The size of the reflective surface can be selected based on the size of an outputted projection image and/or the distance to the projection lens. It should be understood that the shape of the reflective surface may differ from the illustrated shape so as to accommodate different projection device configurations.

In the illustrated embodiment, two mounting tabs 304 protrude from reflector base 310. Mounting tabs 304 can take the shape of rectangular blocks that partially extend above reflector base 310. Mounting tabs 304 and reflector base 310 can be made from a resilient plastic that bends, allowing the mounting tabs to snap into appropriately configured projection devices. For example, mounting tabs 304 can be configured to fit into complementary orifices of the projection device. The reflector and the projection device cooperate with one another to so that the redirector can be attached in a desired position with a desired orientation so as to redirect video content in a desired direction.

In the illustrated embodiment, support frame 306 connects overhang mounting tab 308 to underside mounting tabs 304 via reflector base 310. When mounted, support frame 306 frames the projection lens of a projection device without obstructing a projected image. Overhang mounting tab 308 can be configured to cooperate with reflector base 310 and underside mounting tabs 304 to snap fit onto the projection device. Support frame 306 and overhang mounting tab 308 can be comprised of a resilient plastic that can bend during the reflector mounting process so as to allow the mounting tabs to snap into place. The resiliency of the support frame enables reflector 300 to snap into place and mount to the projection device.

Figure 20:
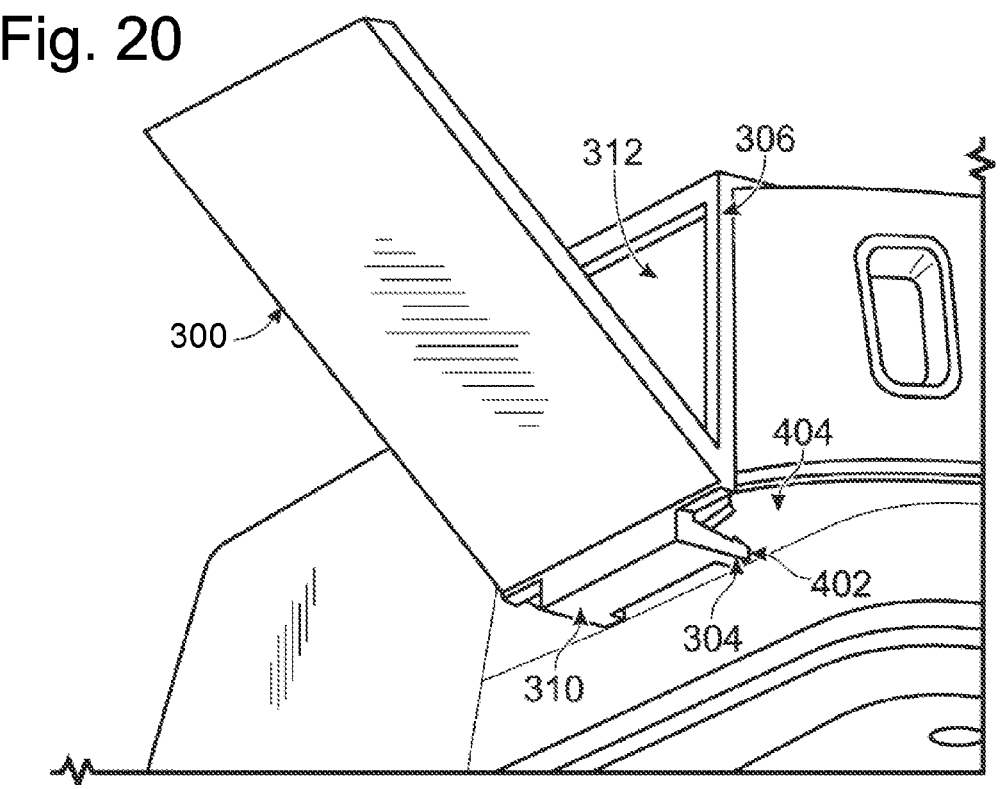
FIG. 20 is another view of the projection device and redirector of FIG. 18.

FIG. 20 shows reflector 300 with mounting tabs 304 protruding from reflector base 310 and inserted into complementary configured orifices 402 of projection device 202. As shown, reflector base 310 extends under an overhang 404 of the projection device. Support frame 306 can be configured to frame projection lens 312 so as to allow an image to be projected without obstruction.

Some embodiments may have different support frames and/or mounting tabs (or other fastening mechanisms) while remaining within the scope of the present disclosure. For example, a support frame may only extend up one side of the projection lens. A support frame may be shaped as an arch around the perimeter of a projection lens. In some embodiments, the frame can support the reflector strictly from below without extending above the projection lens. The support frame may be made of plastic, metal, various composites, or other suitable materials without departing from the scope of the present disclosure.

In some embodiments, a reflector can be mounted to a projection device using a variety of mounting mechanisms different from the mechanism shown in FIG. 20. For example, some embodiments may have a reflector screwed into the front face of a projection device. In some embodiments, an adjustable clamp can be used to fasten a reflector to a projection device. In some embodiments, magnetic strips can be used. In some embodiments, mounting tabs can be configured to snap fit into complementary orifices above the projection lens and the reflector can hang down in front of the projection lens.

Figure 21:
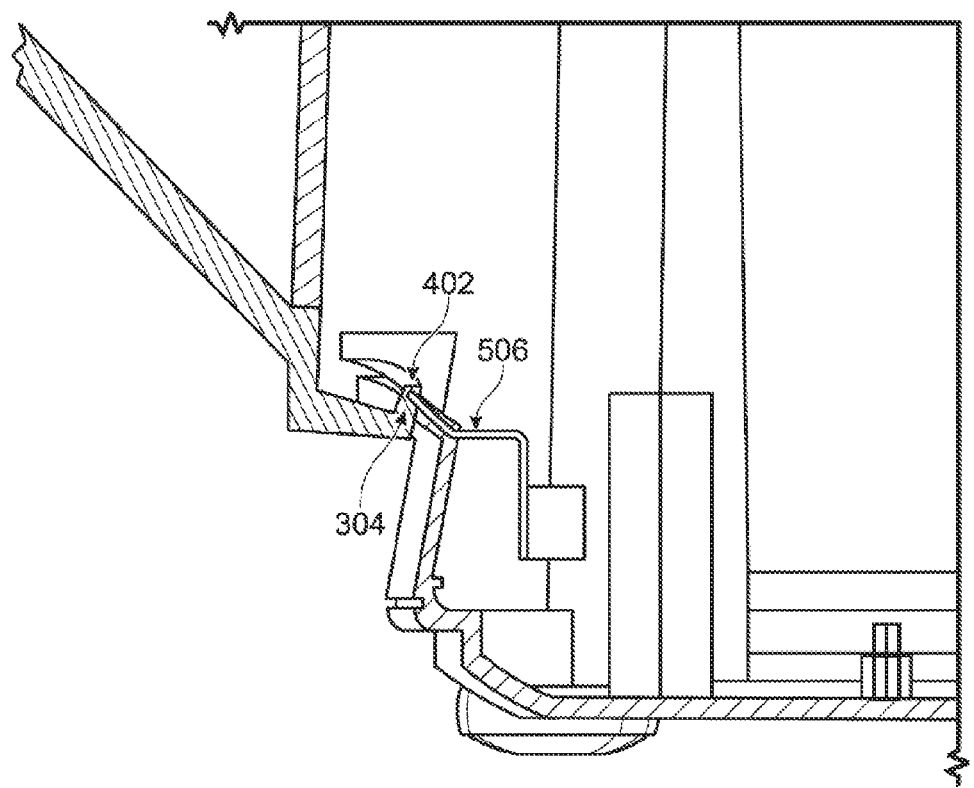
FIG. 21 shows a cross sectional view of the projection device and redirector of FIG. 18.

In some embodiments, a projection device may include one or more sensors for detecting the presence of an installed reflector, such as reflector 300. For example, FIG. 21 shows a cross sectional view of an underside mounting tab 304 secured into an orifice 402 and interacting with a sensor 506. Reflector detection sensor 506 can be configured to protrude into orifice 402, as shown. When mounting tab 304 is inserted into orifice 402, sensor 506 contacts the mounting tab 304. The projector can include a control system configured to receive input from contact 506, thus allowing the projection system to determine if a reflector is installed. When a reflector is installed, the control system can adjust image projection to correspond with the changes made by the reflector. For example, depending on the output configuration (i.e. front projection, rear projection) of a projection device, a projected image can be modified when a reflector is mounted to a projection device.

In response to detecting a reflector in position to redirect projected video, a projector may be configured to adjust one or more characteristics of the projected video. Nonlimiting examples of the characteristics that can be adjusted to include aspect ratio, keystone corrections, focus, and image orientation. For example, a projected image may be reversed, inverted, resized, or otherwise changed so that it will appear as desired when redirected by the reflector. Such changes can be implemented by a controller. In some embodiments, the controller can be programmed to make user-selected changes responsive to a redirector being configured to redirect the projected video.

The activation of a sensor may be accomplished through a variety of different methods. For example, a conductive sensor may be activated when a mounting tab with a conductive surface comes into contact with the sensor thus opening, closing, shorting, or otherwise modifying an electrical circuit in a predictable manner. In some embodiments, the sensor can be activated when a mounting tab enters an orifice and blocks a light source. Other sensors can be activated by changes in electric or magnetic fields, such as via the use of an RFID tag. The above are nonlimiting examples, and virtually any mechanism for detecting the installation of a reflector can be used without departing from the scope of this disclosure.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A modular projection system, comprising:
a projection device including a docking side substantially defined by a projection device edge-profile and having a first docking interface interior the projection-device edge-profile, the projection device further including a stand-alone video interface configured to receive video content; and
a source module including a docking side substantially defined by a source module edge-profile and having a second docking interface interior the source-module edge-profile and complimentarily configured relative the first docking interface to provide video content to the projection device via the first docking interface, where the projection-device edge-profile substantially matches the source-module edge-profile, and where the stand-alone video interface is accessible when the first docking interface is docked with the second docking interface, and wherein the source module comprises a control for selectively turning the source module on and off, where the control also turns the projection device on and off when the source module is docked to the projection device.

2. The modular projection system of claim 1, where the docking side of the projection device is immediately adjacent the docking side of the source module when the first docking interface is docked with the second docking interface.

3. The modular projection system of claim 2, where the projection-device edge-profile is configured to substantially mechanically align the projection device and the source module.

4. The modular projection system of claim 1, where the projection device is adapted to project video content in a first direction away from the projection device; and
further comprising a redirector, the redirector configured to be removably coupled to the projection device and including a reflective surface and a frame configured to selectively support the reflective surface in a position and orientation relative to the projection device so as to intercept the video content projected in the first direction and redirect the video content in a second direction, different than the first direction.

5. A modular projection system, comprising:
a projection device including a first docking interface located on an underside of the projection device and a stand-alone video interface that is accessible when the underside of the projection device is immediately adjacent a supporting surface, the first docking interface and the stand-alone video interface both being configured to receive video content; and
a plurality of differently configured source modules, each source module including a second docking interface complimentarily configured relative the first docking interface, each source module being configured to provide video content to the projection device via a docked communication link of the first docking interface and the second docking interface.

6. The modular projection system of claim 5, where each of the plurality of source modules are sized and shaped to match a size and shape of the projection device.

7. The modular projection system of claim 6, where the underside is substantially defined by a projection-device edge-profile and the source module includes a docking side substantially defined by a source-module edge-profile that substantially matches the projection-device edge-profile.

8. The modular projection system of claim 7, where the underside of the projection device is immediately adjacent the docking side of the source module when the first docking interface is docked with the second docking interface.

9. The modular projection system of claim 7, where the projection-device edge-profile is configured to substantially mechanically align the projection device and the source module.

10. The modular projection system of claim 5, where the projection device is configured to be operated as a stand-alone projection device independent of any of the plurality of differently configured source modules.

11. The modular projection system of claim 5, where the stand-alone video interface is configured to receive video content from an undocked source.

12. The modular projection system of claim 5, where the projection device includes an input power jack for receiving electricity from an undocked source.

13. The modular projection system of claim 5, where each source module is electrically powered from electricity received from the projection device via the first docking interface and the second docking interface.

14. The modular projection system of claim 5, where the first docking interface and the second docking interface physically, electrically, and communicatively couple the projection device and the source module, deliver video information from the source module to the projection device, and deliver energy from the projection device to the source module.

15. The modular projection system of claim 14, where the projection device comprises a control for selectively turning the projection device on and off, where the control also turns a source module on and off when the source module is docked to the projection device.

16. The modular projection system of claim 5, where the first docking interface and the second docking interface physically, electrically, and communicatively couple the projection device and the source module, deliver video information from the source module to the projection device, and deliver energy from the source module to the projection device.

17. The modular projection system of claim 16, where each of the plurality of source modules comprises a control for selectively turning that source module on and off, where the control also turns the projection device on and off when the projection device is docked to the source module.

18. The modular projection system of claim 5, where the projection device is adapted to project video content in a first direction away from the projection device; and further comprising a redirector, the redirector configured to be removably coupled to the projection device and including a reflective surface and a frame configured to selectively support the reflective surface in a position and orientation relative to the projection device so as to intercept the video content projected in the first direction and redirect the video content in a second direction, different than the first direction.

19. A modular projection system, comprising:
a projection device including a docking side substantially defined by a projection device edge-profile and having a first docking interface interior the projection-device edge-profile, the projection device further including a stand-alone video interface configured to receive video content, the projection device adapted to project video content in a first direction away from the projection device;
a source module including a docking side substantially defined by a source module edge-profile and having a second docking interface interior the source-module edge-profile and complimentarily configured relative the first docking interface to provide video content to the projection device via the first docking interface, where the projection-device edge-profile substantially matches the source-module edge-profile, and where the stand-alone video interface is accessible when the first docking interface is docked with the second docking interface; and
a redirector configured to be removably coupled to the projection device, the redirector including a reflective surface and a frame configured to selectively support the reflective surface in a position and orientation relative to the projection device so as to intercept the video content projected in the first direction and redirect the video content in a second direction, different than the first direction.

20. The modular projection system of claim 19 wherein the source module is sized and shaped to match a size and shape of the projection device such that the projection device and the source module appear as a single integrated unit when the first docking interface is docked with the second docking interface.

21. The modular projection system of claim 20 wherein the first docking interface is located on an underside of the projection device and the stand-alone video interface is accessible when the underside of the projection device is immediately adjacent a supporting surface.

22. The modular projection system of claim 20 wherein the source module is powered from power received from the projection device, or the projection device is powered from power received from the source module, via the first docking interface and the second docking interface.

23. The modular projection system of claim 22 wherein a common control is used to power on and off the projection device and the source module.

* * * * *